May 15, 1923.

G. B. SCHEER

MOTOR CONTROL SYSTEM

Filed June 22, 1922

1,455,668

WITNESSES:
O. M. Cochran
M. Keith

INVENTOR
George B. Scheer
BY
Wesley G. Carr
ATTORNEY

Patented May 15, 1923.

1,455,668

UNITED STATES PATENT OFFICE.

GEORGE B. SCHEER, OF BERKELEY, CALIFORNIA, ASSIGNOR TO WESTINGHOUSE ELECTRIC & MANUFACTURING COMPANY, A CORPORATION OF PENNSYLVANIA.

MOTOR-CONTROL SYSTEM.

Application filed June 22, 1922. Serial No. 570,108.

*To all whom it may concern:*

Be it known that I, GEORGE B. SCHEER, a citizen of the United States, and a resident of Berkeley, in the county of Alameda and State of California, have invented a new and useful Improvement in Motor-Control Systems, of which the following is a specification.

My invention relates to motor-control systems and it has particular relation to systems employing dynamic braking.

One object of my invention is to provide means for insuring dynamic-braking connections for an electric motor upon the failure of the power supply.

Another object of my invention is to provide means for establishing emergency dynamic-braking connections for a reversing motor having a single series field-magnet winding.

Other objects of my invention will become apparent in the following description and the claims appended thereto.

In the prior art, various systems have been proposed, particularly in connection with planer-motor control, for providing dynamic braking, especially in case of failure of power supply under operating conditions, which otherwise would result in the "table" overtraveling and causing inconvenience, or damage to the equipment. Motors of special design were usually required, together with complicated controlling equipment. On the other hand, I am enabled to use a standard motor, preferably compound-wound, and control equipment that is substantially standard in character.

My invention involves the employment of the usual reversing switches that are provided with "back-contacts" for dynamic braking. I employ operating coils for these switches, controlled by means of a master switch in a familiar manner, and additional coils, controlled preferably by the counter-electromotive force of the motor, for maintaining either pair of reversing switches in an operative position during the dynamic-braking period. Means is provided for establishing a circuit through the series field-magnet winding of the motor during dynamic braking in the same direction as during regular operation, the energy being supplied during dynamic braking solely by the counter-electromotive force of the motor armature.

It is customary, particularly in planer operation, to provide a low cutting speed in one direction and a higher return speed of the motor and, consequently, I provide means for regulating the value of the dynamic braking resistance in accordance with the motor speed. I also provide means for increasing the dynamic-braking effect in case of failure of power.

In the accompanying drawing, Figure 1 is a diagrammatic view of circuits and apparatus embodying my invention;

Figure 1:
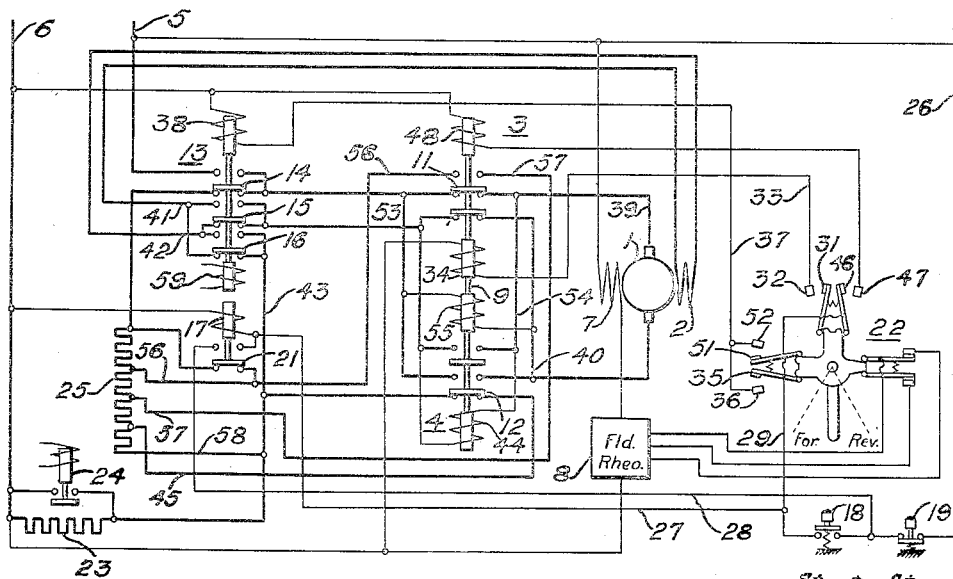

With reference to the accompanying drawing, a motor having an armature 1 and a series field-magnet winding 2 is operatively connected by means of reversing switches 3 and 4 to line conductors 5 and 6. A shunt field-magnet winding 7 is connected, through a rheostat 8, to line conductors 5 and 6. Reversing switches 3 and 4 are preferably interlocked in any desired manner, as by means of a mechanical interlocking-bar 9. Dynamic-braking contact members 11 and 12 are respectively attached to reversing switches 3 and 4. A line switch 13 is also provided with a dynamic-braking contact member 14. Additional contact members 15 and 16 are attached to, and are adapted to be actuated by, the line switch 13.

A no-voltage relay 17 may be controlled by a start-button 18 and a stop-button 19. This relay is also provided with a dynamic-braking contact member 21. The reversing switches 3 and 4 are adapted to be controlled in a familiar manner by means of a master switch 22, which may be of the type illustrated in Patent No. 1,241,510, granted to the Westinghouse Electric & Manufacturing Company on October 2, 1917, upon an application filed by E. A. Hanff. I provide an accelerating resistor 23 and an accelerating switch 24 for controlling the resistor in any desired manner. An additional resistor 25 is employed in the dynamic-braking circuits, as hereinafter described.

By momentarily pressing the push-button 18, a circuit is established for the no-voltage relay 17 extending from line conductor 5 through conductor 26, stop-push-button 19, push-button 18, conductor 27 and the operating coil of relay 17 to line conductor 6. The operation of relay 17 lifts the contact member 21 to complete a holding circuit for the relay coil extending from line conductor 5 through conductor 26, push-button 19, conductor 28, contact member 21 and the operating coil of relay 17 to line conductor 6. It may be assumed that the operating lever of the master switch 22 is actuated in the forward direction, in which case, a circuit is established for the operating coil of reversing switch 3 extending from line conductor 5 through conductor 26, push-button 19, conductor 28, contact member 21 of the no-voltage relay 17, conductors 27 and 29, contact members 31 and 32 of the master switch 22, conductor 33 and operating coil 34 to line conductor 6. Operating coil 34 thus maintains the switch 3 in its lower position. A parallel circuit is also established for energizing the operating coil of line switch 13 extending from conductor 29 through master-switch contact members 35 and 36, conductor 37 and operating coil 38 to line conductor 6.

Line switch 13 thereupon operates to complete a circuit for the armature 1 of the motor extending from line conductor 5 through line switch 13, reversing switch 3, conductor 39, armature 1, conductor 40, reversing switch 3, contact member 15 of line switch 13, conductor 41, series field-magnet winding 2, conductor 42, contact member 16 of line switch 13, conductor 43 and starting resistor 23 to line conductor 6. The motor will now operate in the forward direction, with the main circuit connections as illustrated diagrammatically in Fig. 2.

As the planer table approaches the end of its forward stroke, the master switch 22 is manually returned to its inoperative position, thereby interrupting the circuit of the coil 38 of line switch 13 and coil 34 of reversing switch 3. Line switch 13 will open and establish circuits through its lower or back-contact members, while reversing switch 3 is maintained in its operative position by means of a holding coil 44, which is connected across the terminals of the motor armature 1 through reversing switch 3. A dynamic-braking current thereupon flows through the armature 1 in a direction corresponding to the counter-electromotive force.

Figure 4:
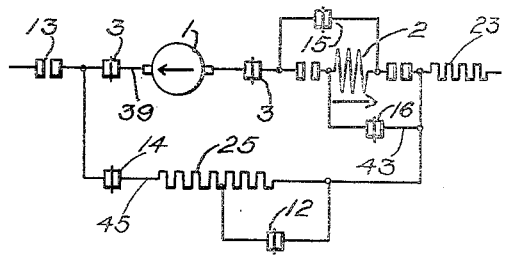
Fig. 4 is a simplified diagrammatic view of the dynamic-braking connections employed when operating the motor in the forward directions.

The circuit connections at this stage are illustrated diagrammatically in Fig. 4. The dynamic-braking circuit extends from one terminal of armature 1 through conductor 39, reversing switch 3, contact member 14 of line switch 13, a portion of dynamic-braking resistor 25, conductor 45, dynamic-braking contact member 12, conductor 43, contact member 16 of line switch 13, conductor 41, series field-magnet winding 2, conductor 42, contact member 15 of line switch 13, reversing switch 3 and conductor 40 to the other terminal of the armature 1.

When the master switch 22 is actuated for the reverse operation, a circuit is established for the operating coil of the reversing switch 4 extending as described for the forward direction of operation to line conductor 29, then through master switch contact members 46 and 47 and operating coil 48 to line conductor 6. Reversing switch 4 is thus lifted and completes a circuit for the motor armature simultaneously with the reclosure of the line switch 13, a circuit for the operating coil 38 of the line switch 13 being re-established through master-switch contact members 51 and 52.

The armature circuit now extends from line conductor 5 through line switch 13, conductor 53, reversing switch 4, armature 1, conductors 39 and 54, reversing switch 4, contact member 15 of line switch 13, conductor 41, series field-magnet winding 2, conductor 42, contact member 16 of line switch 13, conductor 43 and starting resistor 23 to line conductor 6. The motor now operates in the reverse direction, the circuit connections for which are shown diagrammatically in Fig. 3.

When the master switch is manually returned to the inoperative position, as the planer table approaches the end of its reverse motion, the circuit for the operating coil 48 of the reversing switch 4 and the operating circuit of the coil 38 of line switch 13 are interrupted. The line switch 13 then establishes dynamic-braking connections, similar to those previously described, while reversing switch 4 is maintained in its operative position by means of a holding coil 55, which is now connected across the terminals of the armature 1 through reversing switch 4. A dynamic-braking circuit is completed, as illustrated in Fig. 5, extending from the lower terminal of the armature 1 through reversing switch 4, conductor 53, contact member 14 of line switch 13, a portion of dynamic-braking resistor 25, conductor 56, contact member 11 of reversing switch 3, conductor 57, another portion of dynamic-braking resistor 25, conductors 58 and 43, contact member 16, conductor 41, series field-magnet winding 2, conductor 42, contact member 15 and reversing switch 4 to the other terminal of the armature 1.

In the foregoing operations, if the master switch 22 is reversed rapidly, it may be necessary to employ additional means for retaining the line switch 13 in its lower position during dynamic braking. I provide for this purpose, a coil 59 for connection across the motor armature 1. During dynamic braking, this coil is energized by the counter-electromotive force of the motor armature.

Figure 2:
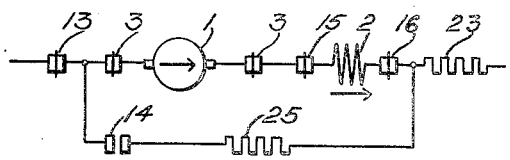
Fig. 2 is a simplified diagrammatic view of the main circuit connections for the motor, during operation in the forward direction.
Figure 3:
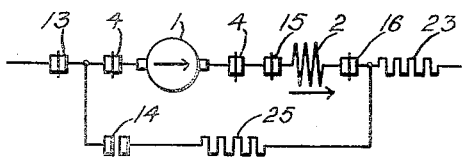
Fig. 3 is a similar view of the main circuit connections for the motor when operating in the reverse direction.
Figure 5:
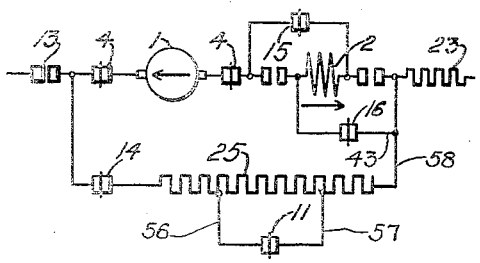
Fig. 5 is a similar view of the circuit connections employed for dynamic braking when the motor is operating in the reverse direction.

The dynamic-braking circuits will be easily understood from an inspection of Figs. 4 and 5, in which the current induced by the counter-electromotive force of the armature flows in the reverse direction with respect to the current in the armature, as in Figs. 2 and 3, that is induced by the impressed line voltage. In all cases it should be noted that the direction of current is never reversed through the series field-magnet winding and, therefore, field magnetization is always properly maintained.

In the event of low voltage, or a total failure of power, the no-voltage relay 17 will release the contact member 21, which establishes a short-circuit for a portion of the dynamic-braking resistor 25, as indicated in Fig. 1 of the drawing. It will be appreciated that this feature is of importance and that the amount of dynamic braking for emergency conditions may, therefore, be adjusted as operating conditions demand. It should be further noted that a larger portion of the dynamic-braking resistor is shunted, in the reverse or high-speed direction of operation, illustrated in Fig. 5, than in the case of forward operation, illustrated in Fig. 4. It is evident that this dynamic-braking effect may be altered to suit the varying requirements of service.

I have described a system of control with particular application to dynamic braking in which a motor of standard type is employed. It should be appreciated that the control system does not involve the use of special apparatus or auxiliary means for maintaining the necessary field excitation of the motor during dynamic-braking periods. I have not described means for varying the motor speed by "shunt field control," which, being old in the art, is sufficiently well understood to require no detailed description.

I claim as my invention:

1. The combination with an electric motor having an armature and a series field-magnet winding, of a plurality of armature-reversing switches, a dynamic-braking resistor and means for energizing said reversing switches to effect dynamic braking upon failure of power supply to said motor.

2. The combination with an electric motor having an armature and a series field-magnet winding, of an armature-reversing switch, a dynamic-braking resistor and means for energizing said switch to insure dynamic-braking connections upon failure of power supply to said motor.

3. The combination with an electric motor having an armature and a series field-magnet winding, of an armature-reversing switch, a dynamic-braking resistor and means dependent upon the speed of the motor for energizing said switch to insure dynamic-braking connections upon failure of power supply to said motor.

4. The combination with an electric motor having an armature and a series field-magnet winding, of an armature-reversing switch, a dynamic-braking resistor and means dependent upon the counter-electromotive force of the motor for energizing said switch to insure dynamic-braking connections upon failure of power supply to said motor.

5. The combination with an electric motor having an armature and a series field-magnet winding, of a dynamic-braking resistor, means for controlling the motor circuit during normal operation and means dependent upon the counter-electromotive force of the motor armature for controlling said first named means to effect dynamic braking.

6. The combination with an electric motor having an armature and a series field-magnet winding, of armature-reversing switches, a dynamic-braking resistor, means for energizing said reversing switches to effect braking upon failure of power supply to the motor and means for varying the degree of dynamic braking.

7. The combination with an electric motor having an armature and a series field-magnet winding, of an armature-reversing switch, a dynamic-braking resistor, means for energizing said switch to insure dynamic-braking connections upon failure of power supply to the motor and means for varying the dynamic-braking effect.

8. The combination with an electric motor having an armature and a series field-magnet winding, of an armature-reversing switch, a dynamic-braking resistor, means dependent upon the speed of the motor for energizing said switch to insure dynamic-braking connections upon failure of power supply to said motor, and means for varying the effective value of the dynamic-braking resistor.

9. The combination with an electric motor having an armature and a series field-magnet winding, of an armature-reversing switch, a dynamic-braking resistor, means dependent upon the counter-electromotive force of the motor for energizing said switch to insure dynamic-braking connections upon failure of power supply to said motor and electro- responsive means for varying the effective value of the dynamic-braking resistor.

In testimony whereof, I have hereunto subscribed my name this 15th day of May 1922.

GEORGE B. SCHEER